(12) United States Patent
Yasui

(10) Patent No.: US 7,762,632 B2
(45) Date of Patent: Jul. 27, 2010

(54) PASSAGE CONNECTING STRUCTURE AND MASTER CYLINDER USING THE SAME

(75) Inventor: Kazuo Yasui, Nagoya (JP)

(73) Assignee: Advics Co., Ltd., Kariya, Aichi (JP)

( * ) Notice: Subject to any disclaimer, the term of this patent is extended or adjusted under 35 U.S.C. 154(b) by 962 days.

(21) Appl. No.: 11/471,611

(22) Filed: Jun. 21, 2006

(65) Prior Publication Data

US 2007/0009321 A1    Jan. 11, 2007

(30) Foreign Application Priority Data

Jul. 11, 2005    (JP) .............................. 2005-201450

(51) Int. Cl.
*F16J 15/10*    (2006.01)
(52) U.S. Cl. ...................... 303/115.1; 60/585
(58) Field of Classification Search ................. 277/926, 277/306, 309, 910, 917; 188/152, 361; 303/114.2, 303/115.1; 60/585
See application file for complete search history.

(56) References Cited

U.S. PATENT DOCUMENTS 3,606,358 A * 9/1971 Tobler .......................... 277/644
3,850,456 A * 11/1974 Hanback et al. ............. 285/114
2004/0040747 A1 * 3/2004 Neville et al. ................. 175/57

FOREIGN PATENT DOCUMENTS

JP    2003-040099 A    2/2003
JP    2004-92678 A    3/2004

OTHER PUBLICATIONS

Official Action issued Sep. 15, 2009 in corresponding Japanese Application No. 2005-201450 and partial English translation of Official Action.

* cited by examiner

*Primary Examiner*—Robert A Siconolfi
*Assistant Examiner*—Anna Momper
(74) *Attorney, Agent, or Firm*—Buchanan Ingersoll & Rooney PC

(57) ABSTRACT

A connecting structure between two passages includes a connecting sleeve including a large-diameter portion and a small-diameter portion with a shoulder surface defined therebetween. A recess is formed in the shoulder surface at its radially inner portion. When the connecting sleeve is inserted into a connecting hole formed in a mating member with a seal member fitted on the small-diameter portion, the seal member is radially compressed and is allowed to swell not only in the direction in which the connecting sleeve is inserted but toward the shoulder surface because the shoulder surface is formed with the recess. This prevents the force that tends to axially slide the radially inner portion of the seal member, thus preventing inclination of the seal member.

2 Claims, 5 Drawing Sheets

PASSAGE CONNECTING STRUCTURE AND MASTER CYLINDER USING THE SAME

CROSS REFERENCE TO RELATED APPLICATION

This application is based on and claims priority under 35 U.S.C. sctn. 119 with respect to Japanese Patent Application No. 2005-201450 filed on Jul. 11, 2005, the entire content of which is incorporated herein by reference.

BACKGROUND OF THE INVENTION

The present invention relates to a connecting structure between two passages through which the two passages are connected together with improved sealing reliability, and a master cylinder of which the reservoir is connected to the cylinder body through such a connecting structure.

A conventional master cylinder used in a vehicle hydraulic brake system is shown in FIG. 5. This master cylinder 30 includes a cylinder body 31, and a reservoir 32 provided on top of the cylinder body 31 for supplying hydraulic fluid into pressure chambers (not shown) defined in the cylinder body. The reservoir 32 is connected to the cylinder body 31 by inserting connecting sleeves 1 provided at its bottom into connecting holes 6 formed in the cylinder body 31. The reservoir 32 is coupled to the cylinder body 31 by separate coupling means (not shown).

The connecting portions between the connecting sleeves 1 and the connecting holes 6 are sealed by rubber seal members 5 to prevent leakage of hydraulic fluid. FIG. 6 shows an enlarged view of one of the connecting portions. Ordinarily, the seal member 5 is, as disclosed in JP patent publication 2003-040099A, a ring having a flat cross-section and having a radially inner cylindrical surface 5a.

The connecting sleeve 1 comprises an upper large-diameter portion 2 and a lower small-diameter portion 3 integrally connected to the bottom end of the large-diameter portion 2 with a shoulder surface 4 defined therebetween. The seal member 5 is fitted around the small-diameter portion 3 as shown in FIG. 6. In this state, the connecting sleeve 1 is inserted into the connecting hole 6 formed in the top surface of the cylinder body 31. When the sleeve 1 is inserted into the connecting hole 6, the seal member 5 is pressed into between the connecting sleeve 1 and the connecting hole 6 and thus is radially compressed. The space between the connecting sleeve 1 and the connecting hole 6 is thus sealed with the seal member 5 pressed against both the connecting sleeve 1 and the connecting hole 6. In this state, the seal member 5 is sandwiched between (but not necessarily pressed against) the shoulder surface 4 of the connecting sleeve 1 and a shoulder surface 9 formed on the inner wall of the connecting hole 6, so that the seal member 5 is prevented from separating from the small-diameter portion 3.

In this conventional connecting arrangement, when the reservoir 32 is mounted on the cylinder body 31, the seal member 5 may incline and remain inclined thereafter. This may result in defective sealing.

FIGS. 7A to 7C show the behavior of the seal member when the reservoir is mounted on the cylinder body. As shown in 7A, when the connecting sleeve 1 is inserted into the connecting hole 6, the seal member 5, which is fitted around the connecting sleeve 1, is compressed radially (in the direction of the arrow in FIG. 7A). The seal member 5 also tends to bulge vertically. But since its top surface is restrained by the shoulder surface 4 of the connecting sleeve 1, the seal member 5 cannot bulge upwardly. This results in the loss of internal pressure balance, causing the radially inner portion of the seal member 5 to slide down as shown in FIG. 7B, which in turn causes the seal member 5 to incline. Thus, even after the reservoir has been mounted on the cylinder body, the seal member 5 tends to remain inclined, resulting in defective sealing. A lubricant is often applied to the outer periphery of the connecting sleeve 1. In this case, since the seal member 5 can easily slip, the seal member 5 tends to incline more easily.

The interior of the reservoir of the master cylinder is kept at the atmospheric pressure during use, so that pressure higher than the atmospheric pressure does not act on the connecting portion between the connecting sleeve 1 and the connecting hole 6. But in order to fill the hydraulic circuit of the brake system with hydraulic oil, hydraulic oil is fed into the circuit under pressure to expel air, or after evacuating the circuit, hydraulic oil is fed under positive pressure. If there exists any defective seal, hydraulic oil may leak or air may be drawn into the circuit. Thus, it is desired to mount the seal member 5 so as to provide a non-defective seal between the connecting sleeve and the connecting hole.

Such a connecting structure may be used in devices other than master cylinders, and in such other devices, too, similar problems may occur.

SUMMARY OF THE INVENTION

An object of the present invention is to prevent the seal member from inclining when the connecting sleeve is inserted into the connecting hole with the seal member fitted on the small-diameter portion of the connecting sleeve, thereby completely eliminating the possibility of the seal member being mounted in an inclined state.

According to the present invention, the shoulder surface defined between the large-diameter portion of the connecting sleeve and the small-diameter portion on which the rubber seal member is mounted is formed with a recess in its radially inner portion. The recess has such a depth as not to hinder axial bulging of the seal member toward the shoulder surface.

The shoulder surface may have a conical surface to define the recess. Otherwise, the recess may be formed only in the radially inner portion of the shoulder surface.

Preferably, the shoulder surface is formed with an air vent groove extending from the recess to the outer periphery of the large-diameter portion to vent air in the recess.

The connecting structure according to the present invention is applicable to the connecting portion between the reservoir and the cylinder body of a master cylinder for a hydraulic brake system, but may be used for connecting portions of other devices.

In a more specific arrangement, the present invention provides a connecting structure between two passages, comprising a connecting sleeve comprising a large-diameter portion and a small-diameter portion integrally provided on one end of the large-diameter portion with a shoulder surface defined between the large-diameter portion and the small-diameter portion, a connecting hole formed in a mating member, and a ring-shaped seal member having a flat cross-section and fitted around the small-diameter portion, the connecting sleeve being inserted in the connecting hole with the seal member being pressed with an interference fit against an outer periphery of the small-diameter portion and an inner wall of the connecting hole, thereby providing a seal between the connecting sleeve and the connecting hole, the shoulder surface being formed with a recess in a radially inner portion thereof. This connecting structure can be used not only for a connecting portion of the reservoir of a master cylinder but for other connecting portions.

By the provision of the recess in the radially inner portion of the shoulder surface of the connecting sleeve, when the seal member 5 fitted on the small-diameter portion is radially compressed, the seal member 5 is allowed to bulge toward the recess too. This prevents the force that tends to slide the radially inner portion of the seal member 5, thus preventing inclination of the seal member 5, which in turn prevents defective sealing.

The recess in the shoulder surface of the connecting sleeve can be formed in a mold simultaneously when forming the entire connecting sleeve. Thus, the formation of the recess does not lead to an increase in the number of manufacturing steps.

By providing an air vent groove extending from the recess to the outer periphery of the large-diameter portion, it is possible to vent air in the recess through the air vent groove. This prevents the seal member from being deformed by air trapped in the recess.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
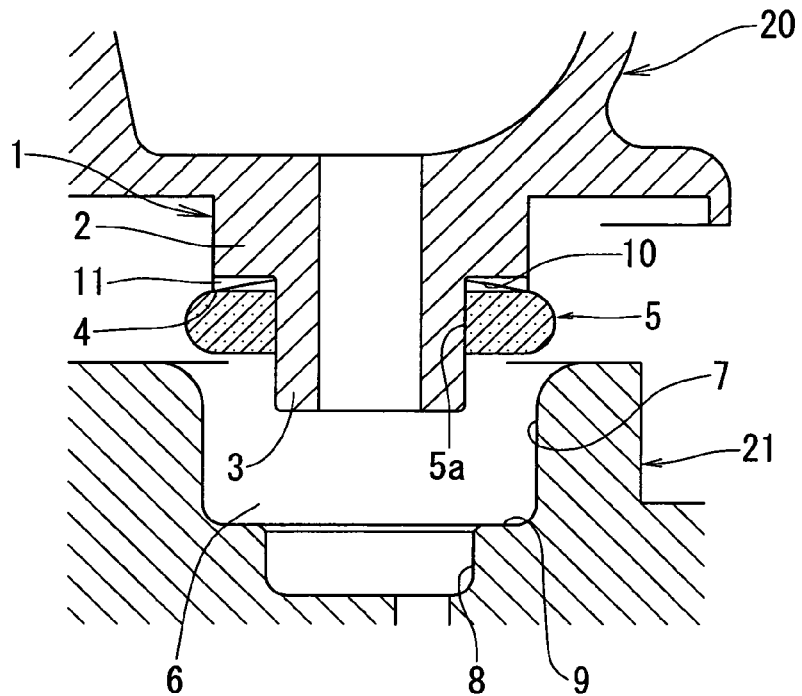
FIG. 1 is a sectional view of a connecting structure between passages according to the present invention.
Figure 2:
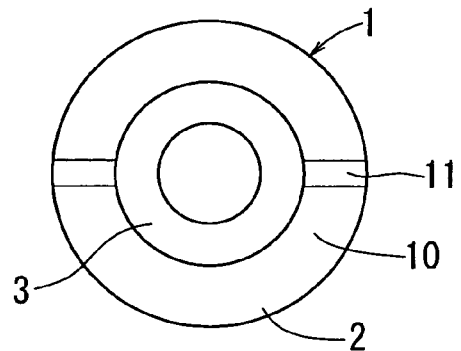
FIG. 2 shows an end surface of a connecting sleeve of the connecting structure of FIG. 1.

A connecting structure between two passages embodying the present invention is now described with reference to FIGS. 1 and 2. The connecting structure includes a connecting sleeve 1 provided on a member 20, a connecting hole 6 formed in a mating member 21 and a seal member 5. The members 20 and 21 are connected together by inserting the connecting sleeve 1 into the connecting hole 6.

The connecting sleeve 1 comprises a large-diameter portion 2 and a small-diameter portion 3 integrally provided on one end (bottom end in the figures) of the large-diameter portion 2 with a shoulder surface 4 defined therebetween.

The connecting hole 6 comprises a large-diameter portion 7 in which the large-diameter portion 2 of the connecting sleeve 1 is snugly received, and a small-diameter portion 8 in which the small-diameter portion 3 is snugly received, with a shoulder surface 9 defined between the large-diameter portion 7 and the small-diameter portion 8.

The seal member 5 is a rubber ring having a cross-section of flat D and having a radially inner cylindrical surface 5a pressed against the outer periphery of the small-diameter portion 3 of the connecting sleeve 1. The seal member 5 is pressed with an interference fit against the outer periphery of the small-diameter portion 3 and the inner wall of the large-diameter portion 7 of the connecting hole 6 to provide a liquid-tight seal therebetween.

Figure 3:
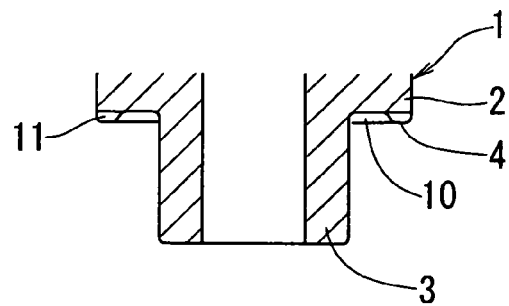
FIG. 3 is a sectional view of a connecting sleeve having a different shoulder surface.

In a conventional arrangement, the shoulder surface 4 of the connecting sleeve 1 is a flat surface perpendicular to the axis of the sleeve 1. According to the present invention, the shoulder surface 4 is tapered radially or formed with a circular step to define a recess 10 in the radially inner portion of the shoulder surface 4. More specifically, the shoulder surface 4 of FIG. 1 is a conical surface (radially inwardly receding tapered surface) to define the recess 10. The shoulder surface 4 of FIG. 3 is formed with a circular step at its radially intermediate portion to define the recess 10 radially inside of the circular step.

The depth of the recess 10 may be uniform or vary radially. The recess 3 has such a depth as not to hinder axial bulging of the seal member 5 toward the shoulder surface 4 when the seal member 5 is radially compressed.

Preferably, the shoulder surface 4 is formed with air vent grooves 11 for venting air in the recess 10.

When the connecting sleeve 1 is inserted into the connecting hole 6, the seal member 5, which is fitted on the connecting sleeve 1, is radially compressed. The seal member 5 thus bulges not only in the direction in which the sleeve 1 is inserted into the connecting hole 6, but in the direction opposite to this direction (i.e. toward the shoulder surface 4). This prevents the force that tends to slide the radially inner portion of the seal member 5, thus preventing inclination of the seal member 5.

Figure 4:
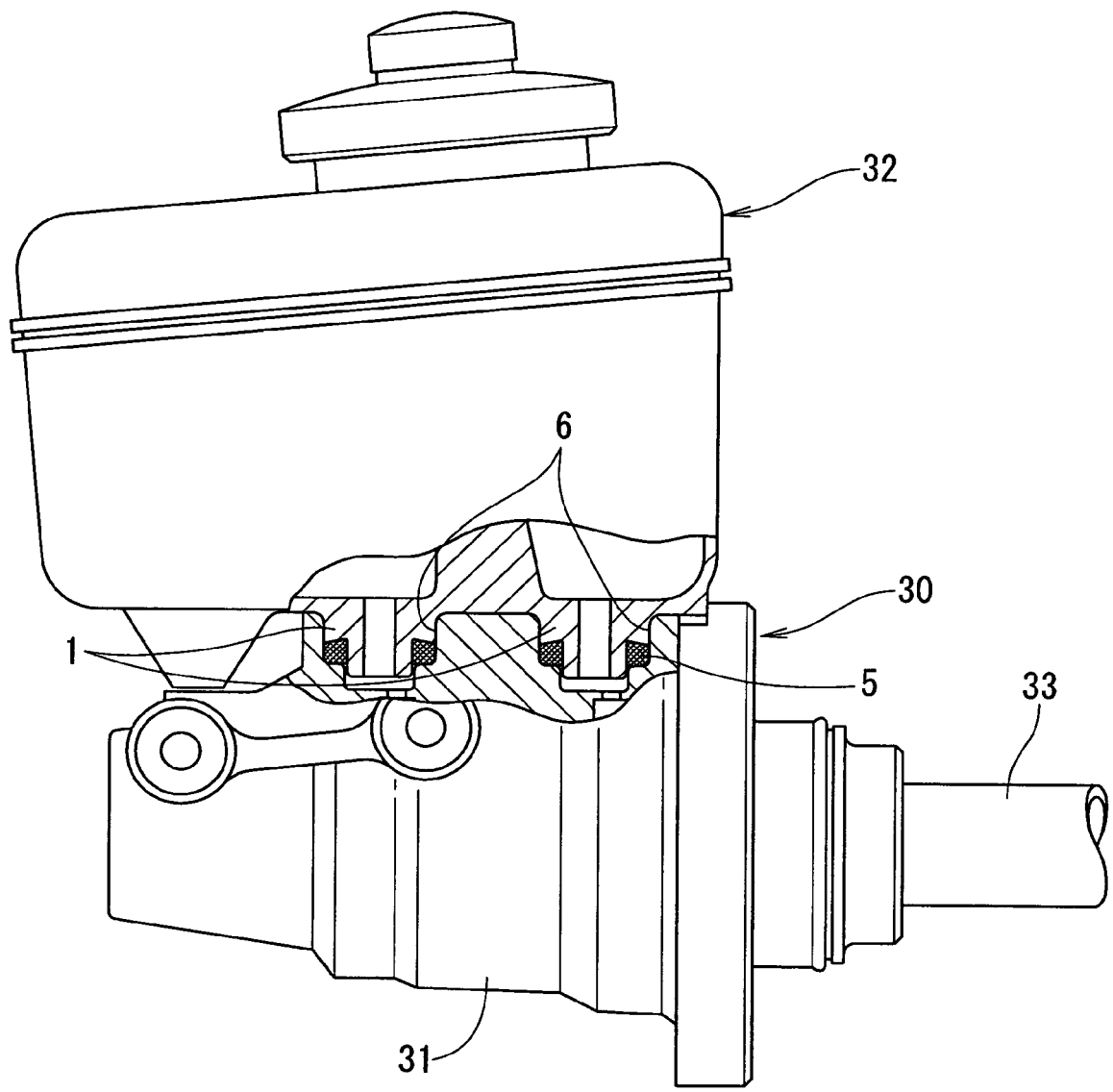
FIG. 4 is a partially cutaway side view of a master cylinder according to the present invention.
Figure 5:
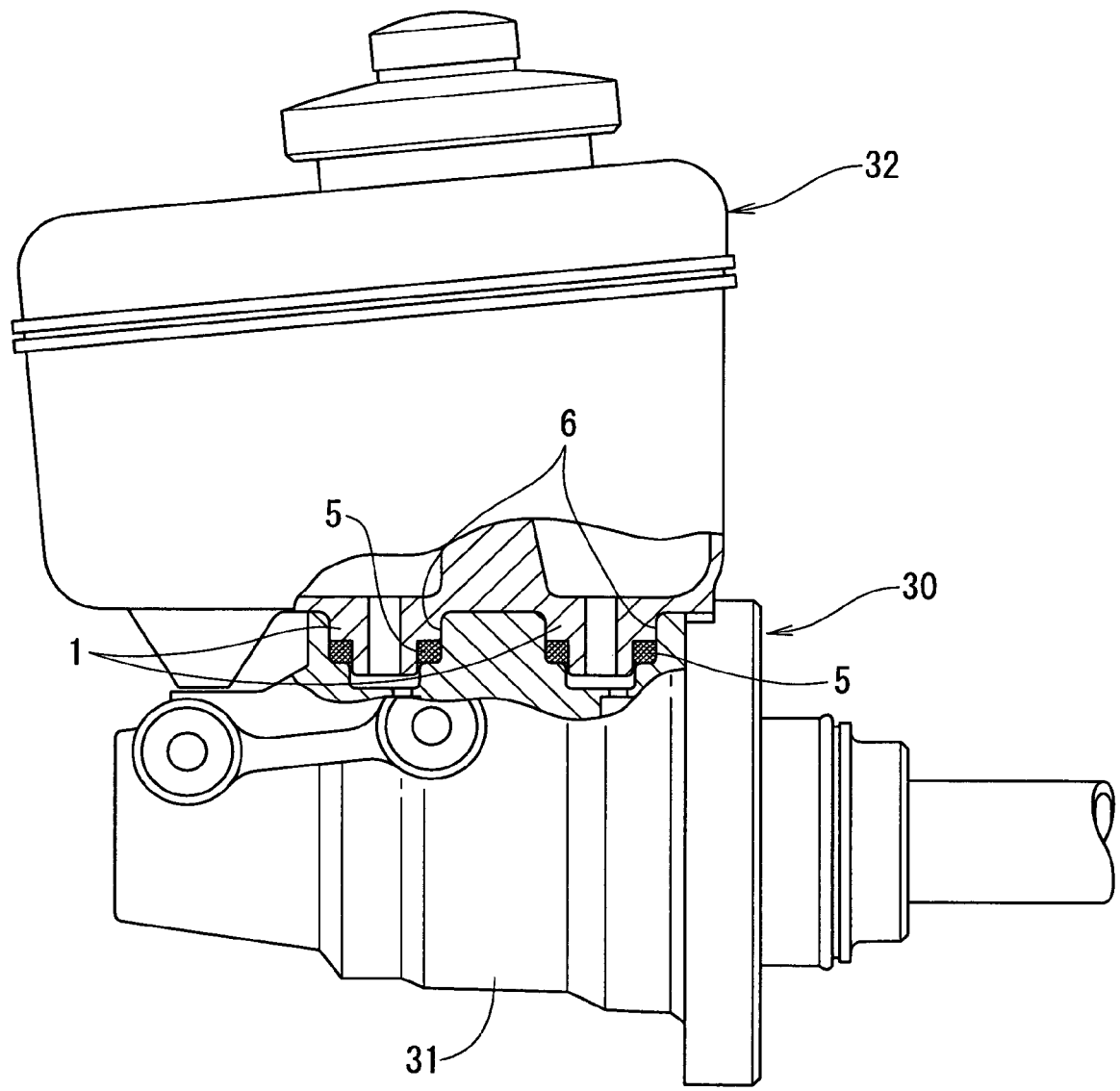
FIG. 5 is a partially cutaway side view of a conventional master cylinder.
Figure 6:
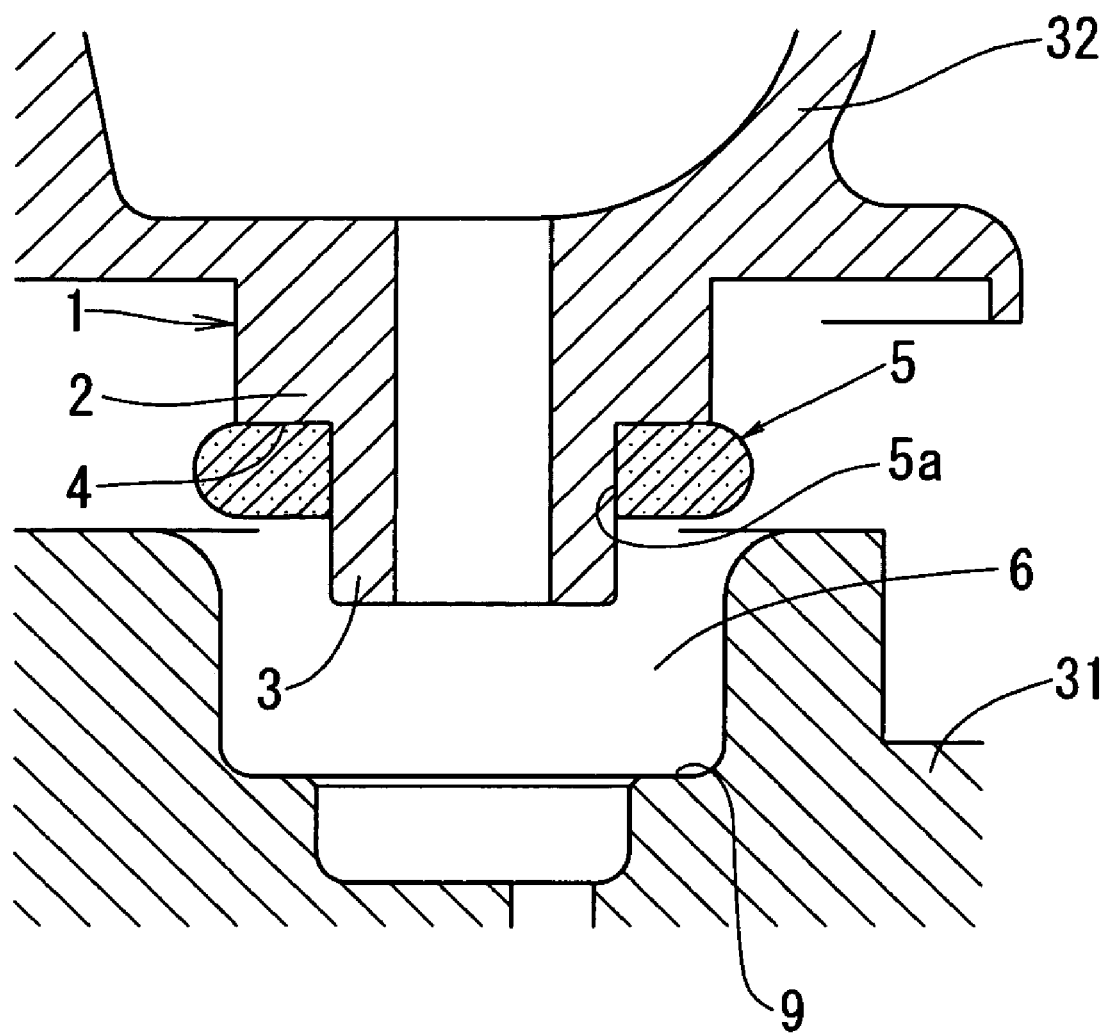
FIG. 6 is a sectional view of a connecting structure between the reservoir and the cylinder body of the master cylinder of FIG. 5, showing the state before assembly.
Figure 7A:
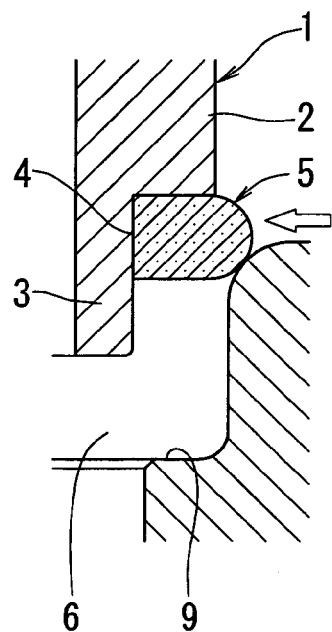
FIGS. 7A to 7C show the behavior of the seal member of FIGS. 5 and 6 when the reservoir is mounted on the cylinder body.
Figure 7B:
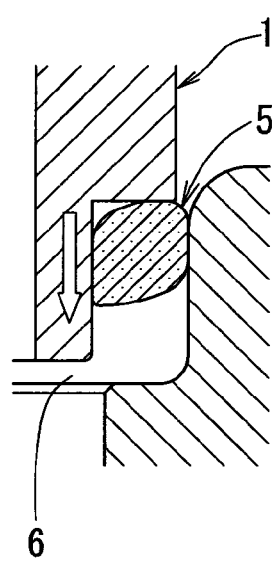
Figure 7C:
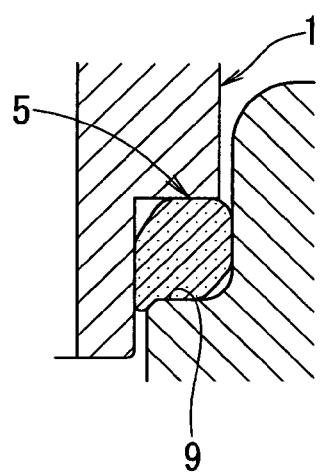

FIG. 4 shows a master cylinder 30 according to the present invention, which comprises a cylinder body 31 and a reservoir 32 mounted on top of the cylinder body 31. The reservoir 32 has connecting sleeves 1. The cylinder body 31 is formed with connecting holes 6. The connecting sleeves 1 are each connected to one of the connecting holes 6 by means of the connecting structure shown in FIG. 1. Although only a primary piston 33 is shown in FIG. 4, the master cylinder 30 also includes a secondary piston and return springs for the primary and secondary pistons, respectively. A first pressure chamber is defined between the primary and secondary pistons in which hydraulic pressure is produced by pressurizing hydraulic fluid therein with the primary piston. A second pressure chamber is defined between the secondary piston and the end wall of the cylinder body in which hydraulic pressure is produced by pressuring hydraulic fluid therein with the secondary piston. Except for the connecting structures between the connecting sleeves 1 and the connecting holes 6, the master cylinder 30 according to the present invention is identical to known master cylinders. Thus, any further description thereof is omitted.

What is claimed is:

1. A master cylinder for a hydraulic brake system comprising a reservoir having a connecting sleeve comprising a large-diameter portion and a small-diameter portion integrally provided on one end of said large-diameter portion with a shoulder surface defined between said large-diameter portion and said small-diameter portion, a cylinder body formed with a connecting hole, and a ring-shaped seal member having a flat cross-section and fitted around said small-diameter portion, said connecting sleeve being inserted in said connecting hole with said seal member being pressed with an interference fit against an outer periphery of said small-diameter portion and an inner wall of said connecting hole, thereby providing a seal between said connecting sleeve and said connecting hole, said shoulder surface being formed with a recess in a radially inner portion thereof, wherein said inner wall is a radially-inwardly facing inner wall.

2. A master cylinder for a hydraulic brake system comprising a reservoir having a connecting sleeve comprising a large-diameter portion and a small-diameter portion integrally provided on one end of said large-diameter portion with a shoulder surface defined between said large-diameter portion and said small-diameter portion, a cylinder body formed with a connecting hole, and a ring-shaped seal member having a flat cross-section and fitted around said small-diameter portion, said connecting sleeve being inserted in said connecting hole with said seal member being pressed with an interference fit against an outer periphery of said small-diameter portion and an inner wall of said connecting hole, thereby providing a seal between said connecting sleeve and said connecting hole, said shoulder surface being formed with a recess in a radially inner portion thereof, wherein said inner wall of said connecting hole faces said small-diameter portion of said connecting sleeve.

\* \* \* \* \*